Patented Sept. 18, 1934

1,973,693

UNITED STATES PATENT OFFICE 1,973,693

NEW COMPOSITION OF MATTER AND METHOD OF PRODUCING

Wyly M. Billing and John S. Tinsley, Kenvil, N. J., assignors to Hercules Powder Company, Wilmington, Del., a corporation of Delaware No Drawing. Application September 6, 1930, Serial No. 480,184

7 Claims.  (Cl. 260—101)

This invention relates to a new composition of matter and method of producing. More particularly the new composition of matter involves cellulose butyroacetates and method for their production.

The new composition of matter, or cellulose butyroacetate, in accordance with this invention as obtained is a white, flaky, odorless material, soluble in a wide range of solvents, including ethylene dichloride, acetone, ethyl acetate, etc., and insoluble in, for example, coal tar hydrocarbons, as toluol, benzene, etc., butyl acetate, methyl cellosolve, etc. In the composition the desirable characteristics of an acetate will predominate while advantageous characteristics not possessed by the acetates nor by the butyrates are obtained by the presence of the butyrates.

The new composition will deposit from solutions as a clear, strong film, practically free from haze and highly advantageous for use as a covering and moisture proofing material, in the many and varied uses for which the material known commercially as "cellophane" is used, in the production of moving picture film, lacquers, molded objects, filaments, threads, etc.

The composition can be plasticized with various substances as sulfon-amides, aromatic esters of phosphoric acid, esters of phthalic acid, etc., or mixtures thereof.

In the preparation of the composition desired viscosity and composition may be obtained, and the composition may be readily deposited from a solution to form a film.

The composition will be found to be productive of a film of very substantial strength and clarity and to be superior to cellulose acetate from which it radically differs, more especially in that it may be treated to produce less inflammable films by plasticizing, for example, with a phosphate which is per se incompatible with cellulose acetate and it may be dissolved in less inflammable solvents as, for example, ethylene dichloride.

It will be appreciated that the composition in accordance with this invention is not only sharply differentiated from the well known cellulose acetate but is essentially differentiated from cellulose acetate butyrate, produced, for example, as disclosed by British Patent No. 321,575, by the treatment of cotton, which has been treated with a small quantity of glacial acetic acid, with a mixture of butyric acid, butyric anhydride, and a suitable esterifying catalyst. The cellulose aceto-butyrate of the British patent has the characteristic low melting point of the butyrates and higher fatty esters and is soluble, for example, in coal tar hydrocarbons, as toluol, benzene, etc., in which the composition embodying this invention is not soluble, and will be recognized as sharply distinguished in composition and characteristics from the cellulose butyroacetates comprising the composition embodying this invention.

Having now indicated the nature of this invention, we will proceed to a detailed description of the method embodying our invention and from which the exact nature of the composition will be clear.

In carrying out the method in accordance with this invention cellulose, which may be of any desired kind, as cotton, wood pulp, plant pulp, etc., suitably purified, may be used though preferably the cellulose will be hydrated, for example, by treatment in a beater, or with sulphuric acid, phosphoric acid, or the like, or by crystallization of sodium acetate in or on the fibres, etc., to render it more easily esterifiable.

The cellulose chosen, either merely purified, or if desired, hydrated, is first treated by wetting with glacial acetic acid and permitted to stand for a period. Alternatively, in the first treatment the cellulose may be wetted with butyric acid, or with a mixture of butyric acid and acetic acid.

After the cellulose, wetted with acetic acid, has stood for a period, it is esterified by treatment with butyric acid, acetic anhydride and an esterification catalyst, as for example, sulphuric acid, an organic sulphonic acid, zinc chloride, or the like, in admixture. When the mass begins to gel, it is stirred and then heated to complete the solution of the cellulose.

After the solution is complete the cellulose butyroacetate is precipitated by the addition of a non-solvent therefor, which is a solvent for the excess organic acids present, as for example, water, an ether, as ethyl ether, a hydrocarbon, as toluol, or the like.

As a practical illustration of the carrying out of the method outlined above, for example, about ten parts of cellulose, as purified cotton linters, either as such or pretreated for about twelve hours with about 40%–50% sulphuric acid, washed and dried, is wetted with, for example, about 2.5 parts of glacial acetic acid and the cellulose is permitted to stand for about 10–15 hours at room temperature, after which a mixture consisting of about 25 parts acetic anhydride, about 50 parts butyric acid and about 0.5 parts sulphuric is added.

In about one-quarter of an hour the mass will begin to gel and the temperature will rise to about 35° C.–40° C. The mass is then stirred for about one-half hour and then heated at about 50° C. for about one-half hour to complete the solution of the cellulose. The cellulose butyroacetate is then precipitated in the form of white flakes by the addition of water, or any other non-solvent for the product which is solvent for the excess organic acids present, the product being then washed and dried.

As has been indicated, in carrying out the method in accordance with this invention the cellulose may be treated with butyric acid or a mixture of butyric and acetic acids and then with a mixture of butyric acid, acetic anhydride and an esterification catalyst and it will be understood that where in the claims appended hereto we specify treatment with acetic acid, we intend to cover treatment with butyric acid or a mixture of butyric and acetic acid as equivalent procedures, it being noted that essentially in order to obtain the new composition in accordance with our invention such treated cellulose is treated with butyric acid and acetic anhydride in admixture.

It will be understood that the time given herein in connection with the various steps in our process, as well as the temperatures and quantities, may be widely varied depending upon conditions, as of the cellulose, viscosity desired for the product, etc., without departing from the scope of our invention.

What we claim and desire to protect by Letters Patent is:

1. As a new composition of matter cellulose butyroacetate, produced by treating a cellulose with acetic acid and then with a mixture of butyric acid, acetic anhydride and an esterification catalyst and characterized by insolubility in coal tar hydrocarbons.

2. As a new composition of matter cellulose butyroacetate, produced by treating a cellulose with acetic acid and then with a mixture of butyric acid, acetic anhydride and an esterification catalyst and characterized by insolubility in toluol.

3. The method of producing cellulose butyroacetate insoluble in coal tar hydrocarbons which includes treating a cellulose with acetic acid and then with butyric acid, acetic anhydride and an esterification catalyst in admixture.

4. The method of producing cellulose butyroacetate insoluble in coal tar hydrocarbons which includes treating a cellulose with acetic acid and then with butyric acid, acetic anhydride and sulphuric acid in admixture.

5. The method of producing cellulose butyroacetate insoluble in coal tar hydrocarbons which includes hydrating a cellulose, treating the cellulose with acetic acid and then with butyric acid, acetic anhydride and an esterification catalyst in admixture.

6. The method of producing cellulose butyroacetate insoluble in coal tar hydrocarbons which includes hydrating a cellulose, treating the cellulose with acetic acid and then with butyric acid, acetic anhydride and sulphuric acid in admixture.

7. The method of producing cellulose butyroacetate insoluble in coal tar hydrocarbons which includes treating a cellulose with sulphuric acid, then treating the cellulose with acetic acid and finally treating with butyric acid, acetic anhydride and an esterification catalyst in admixture.

WYLY M. BILLING.
JOHN S. TINSLEY.